(No Model.) 3 Sheets—Sheet 1.
R. STALKER, G. BATY & J. JOHNSTON.
MANUFACTURE OF FELT HATS.
No. 578,503. Patented Mar. 9, 1897.
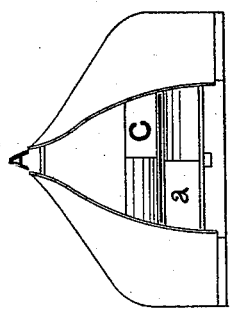
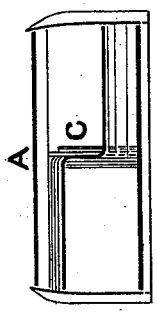
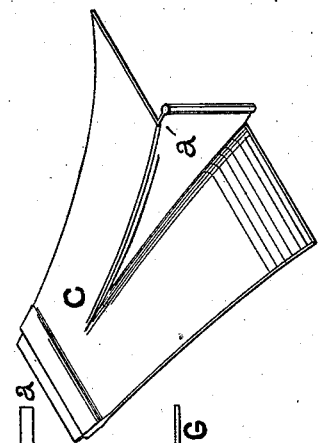
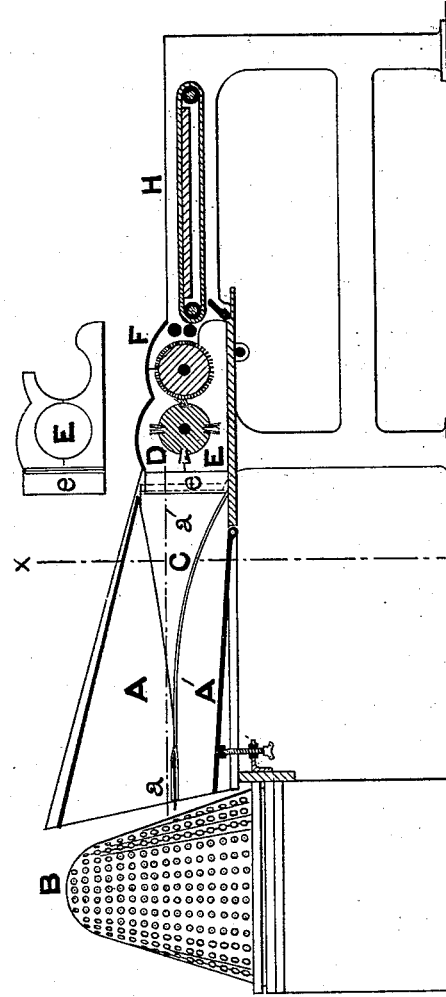
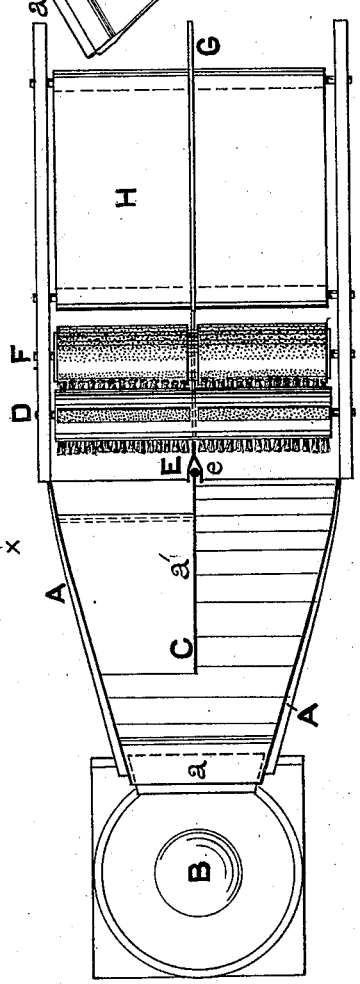
WITNESSES.
Chas. O. Wendall
Joseph Bates.
INVENTORS.
Robert Stalker
Geo Baty
James Johnston
by Wm. T. Thompson & Co.
attys.

(No Model.) 3 Sheets—Sheet 2.
R. STALKER, G. BATY & J. JOHNSTON.
MANUFACTURE OF FELT HATS.
No. 578,503. Patented Mar. 9, 1897.
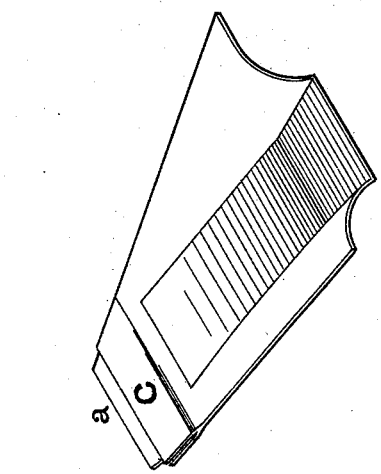
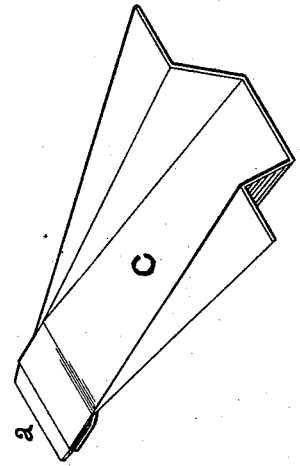
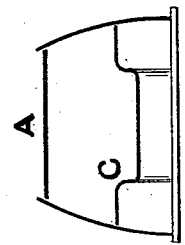
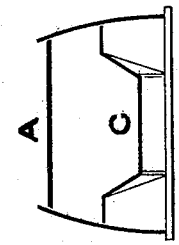
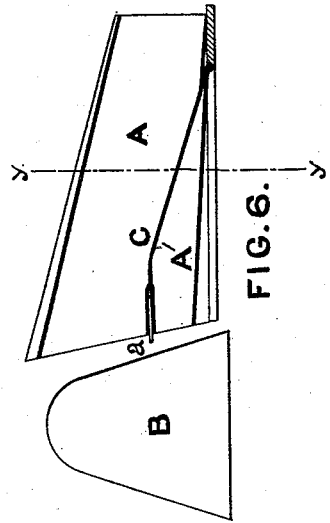
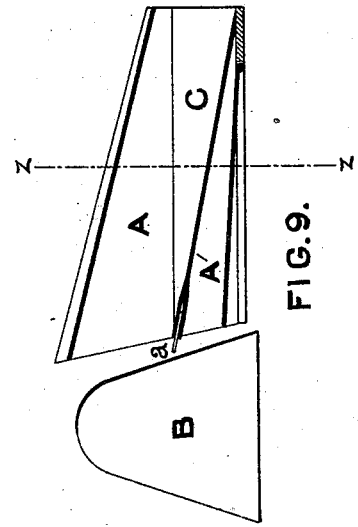
WITNESSES.
Chas. O. Wendall
Joseph Bates
INVENTORS.
Robert Stalker
Geo Baty
James Johnston
by Wm Powell Thompson & Co
attys.

(No Model.) 3 Sheets—Sheet 3.

R. STALKER, G. BATY & J. JOHNSTON.
MANUFACTURE OF FELT HATS.

No. 578,503. Patented Mar. 9, 1897.

WITNESSES.
Chas. O. Vendall
Joseph Bates

INVENTORS.
Robert Stalker
Geo Baty
James Johnston
by W. P. Thompson & Co.
attys.

THE NORRIS PETERS CO., PHOTO-LITHO., WASHINGTON, D. C.

UNITED STATES PATENT OFFICE.

ROBERT STALKER, GEORGE BATY, AND JAMES JOHNSTON, OF STOCKPORT, ENGLAND, ASSIGNORS TO SAID BATY, AND ALBERT TURNER AND ARNOLD TURNER, OF DENTON, ENGLAND.

MANUFACTURE OF FELT HATS.

SPECIFICATION forming part of Letters Patent No. 578,503, dated March 9, 1897.

Application filed December 7, 1895. Serial No. 571,427. (No model.)

*To all whom it may concern:*

Be it known that we, ROBERT STALKER, GEORGE BATY, and JAMES JOHNSTON, subjects of the Queen of Great Britain, residing at Stockport, in the county of Chester, England, have invented certain new and useful Improvements in the Manufacture of Felt Hats, of which the following is a specification.

In the manufacture of felt hats from fur as hitherto carried out it has been the practice to make the crown and the brim of the same quality of material, though making the brim thicker and stiffer than the crown.

This invention is designed to reduce the cost of manufacture without impairing the appearance or durability of the hat; and it consists, essentially, in means for manufacturing the hat of one, two, or more different qualities (or colors) of material, the better quality being placed to form the crown and the lower quality to form the brim, and also in constructing a hat-forming machine with one or more partitions or an additional funnel placed in the delivery-trunk, by which two (or more) different qualities of fur can be simultaneously deposited on the forming-cone, the better quality on the crown and the lower quality at the base to form the brim of the hat.

The invention will be fully described with reference to the accompanying drawings.

Figure 15:
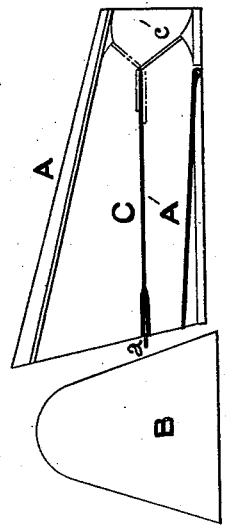
Figure 13:
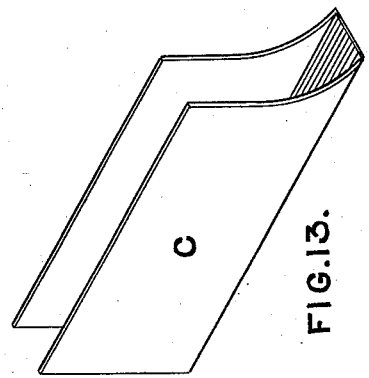
Figure 14:
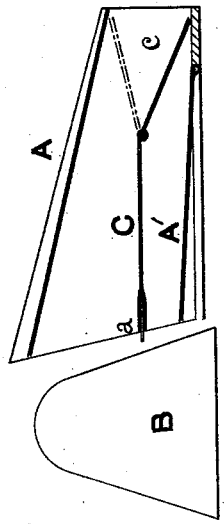
Figure 12:
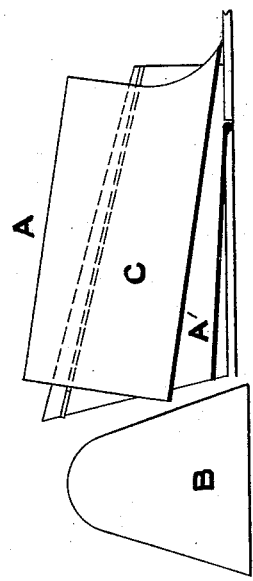

Figure 1 is a longitudinal section of a machine for making hat-bodies constructed according to our invention. Fig. 2 is a sectional plan of same. Fig. 3 is an end elevation of delivery-trunk. Fig. 4 is a transverse section through delivery-trunk on line $xx$, Fig. 1. Fig. 5 is a perspective view of the separating or dividing partition. Fig. 6 is a longitudinal section through delivery-trunk, showing another form of partition. Fig. 7 is a transverse section of same on line $yy$, Fig. 6. Fig. 8 is a perspective view of partition shown in Fig. 6. Fig. 9 is a longitudinal section through trunk, showing another modification. Fig. 10 is a transverse section of same on line $zz$, Fig. 9. Fig. 11 is a perspective view of partition shown in Fig. 9. Fig. 12 is a longitudinal section through trunk, showing another modification. Fig. 13 is a perspective view of partition shown in Fig. 12. Figs. 14 and 15 are longitudinal sections through trunk, showing other modifications.

In the carrying out of this invention the fur is applied to the forming-cone in two streams simultaneously. These streams are divided or separated, one being deposited on the top part of the cone and the other being deposited on the base of the cone. The two qualities of fur are also fed simultaneously into the machine. By this method of applying the fur to the cone the crown of the hat can be made of much finer quality than the brim, and also the brim may be made much thicker than the crown, as a greater weight of fur can be supplied to form the lower stream than the upper one.

In the trunk A of the machine, through which the fur is blown onto the perforated cone B, we place one or more partitions C to divide the trunk A into two or more sections horizontally at its delivery end, the partitions being so shaped or arranged as to receive the fur issuing from the brush or fan D as it is blown forward from the under side thereof. These partitions may be made of various shapes or applied in several ways to the trunk of the machine, with the same object of depositing the fur in two or more belts or bands upon the cone for the purpose of forming the crown and brim of different quality of material.

Referring to Figs. 1 to 5, we place in the delivery funnel or trunk A a partition formed to make two funnels or chutes with the partition $a'$ between the two at the receiving end vertical and the partition $a$ at the delivery end horizontal. Any fur fed to the right of the vertical part $a'$ of the partition will be delivered at the base of the cone B and any fed to the left will be delivered at the top of the cone. To prevent the different furs becoming mixed in their passage through the machine to the delivery-trunk A, a thin strong plate E of sheet copper, steel, or other material is placed to surround the brush or fan D and the card-roller F, and a strip or piece G of wood or other material may be placed on the traveling feed-table H to divide it into two compartments.

The division-plate E is fitted close up to the body of the brush, some of the bristles being removed, or a groove can be made therein and is preferably made in two parts to be easily fitted into position. In the front edge it is made with a vertical slot or groove e, and the vertical part a' of the partition C is provided with a thickened or beaded edge. The slot e is three to four inches deep and the edge of the partition fits therein, thereby allowing for the trunk A to be drawn out or in and the delivery end to be moved to the right or left as may be required.

In Figs. 6, 7, and 8 the partition C is of trough shape, the central part inclined upward to meet the horizontal front part, and the sides are curved over to prevent the intermingling of the fur fed to the center with that fed at the sides. The feed-table is divided into three compartments, the fine fur being fed in the center part and the coarse or heavy fur at the sides.

In Figs. 9, 10, and 11 a modified form of the partition referred to in Figs. 6 and 8 is shown. This partition may be further modified by making it trough-shaped throughout, with inclined bottom and vertical sides, the sides extending up to and through the top of the trunk A, as in Figs. 12 and 13. In this form it may be placed either in the center or to one side of the trunk, and the traveling feed-table will be arranged with corresponding divisions.

In Fig. 14 a horizontal partition C is shown with a hinge or joint at a short distance from the brush, so that the end piece c can be raised or lowered to direct the fur from the brush D, either above or below the partition. By this arrangement the coarse fur can first be fed to the lower part of the cone and the hinged end c of the partition lowered and the finer fur fed to the upper part of the cone.

Fig. 15 shows another modification on which a reversible or pivoted attachment c' is added to the rear end of the partition, so arranged that one part of it will block the entrance to the chamber above the partition and when reversed the other part will block or close the entrance to the chamber below the partition and present an incline for the fur to travel to the upper side of the partition. In this case also the two qualities of fur will be fed separately, first one and then the other.

It will be understood that, if desired, the trunk A may be divided by two partitions into three chambers and thus a still lower quality of material may be used for the edge of the brim, which is largely pared away during the curling and shaping of the brim.

In each case the horizontal front edge of the partition may be provided with a tongue a, sliding in a slot or groove, which can be drawn in and out and adjusted to come within the desired proximity to the cone B to prevent the streams of fur mixing before being deposited on the cone.

In operation the different qualities are fed into the machine simultaneously and kept separate by divisions on the feed-table, or they may be simply so spread as to enter the machine without becoming mixed. The funnel or partition takes the finer fur and delivers it on the cone in position to form the crown and the coarser fur is delivered thereon in position to form the brim. By this means we form a hat with fine fur in the crown and coarser fur or wool in the brim, or the hat may be formed of three qualities—the finer in the crown, the second quality in the brim, and a very coarse quality of fur or fur mixed with wool in the part which forms the edges of the brim and from which the parings are taken in shaping and paring the brim. The hats so formed may be of any required strength of crown or brim. A very heavy or strong brim can be put on a very light crown or a heavy crown can be put with a light brim with the advantage that all the hats of the same class will be exactly alike and the same description of hat can at any time be duplicated.

What we claim as our invention, and desire to protect by Letters Patent, is—

1. In a machine for manufacturing felt hats the combination with the delivery-trunk of a partition placed horizontally dividing it into a number of chambers with discharge-apertures at different horizontal levels, whereby the fur is caused to be deposited simultaneously in belts or bands at different levels to form the hat-body thus providing for the use of different grades of fur for different portions of the hat substantially as described.

2. A machine for manufacturing felt hats comprising a forming-cone B, a delivery-trunk A a partition C inserted in the trunk by which it is divided into horizontal compartments to allow of two different grades of fur being passed through separately at the same time, feed-brushes D and F, a division-plate E surrounding the feed-brushes and a feed-table H provided with dividing-strip to prevent the mixing of the fur thereon substantially as and for the purpose described.

3. A trunk for hat-forming machines hava partition C comprising two surfaces, one inclined above and the other below the horizontal plane and connected together by a vertical piece a' to divide the trunk into a number of chambers one above the other at the delivery end.

In testimony whereof we have signed our names to this specification, in the presence of two subscribing witnesses, this 25th day of November, 1895.

ROBERT STALKER.
GEO. BATY.
JAMES JOHNSTON.

Witnesses:
J. OWDEN O'BRIEN,
CHAS. OVENDALL.